United States Patent [19]
Ferrarin

[11] Patent Number: 5,899,481
[45] Date of Patent: May 4, 1999

[54] TELESCOPIC ELEMENT, PARTICULARLY FOR FRAMES OF FOLDING BICYCLES

[75] Inventor: Francis Ferrarin, Milan, Italy

[73] Assignee: Idit International Design N.V., Netherlands

[21] Appl. No.: 08/706,258

[22] Filed: Sep. 4, 1996

[30] Foreign Application Priority Data

Sep. 6, 1995 [IT] Italy ................................. MI95A1876

[51] Int. Cl.⁶ .................................................. B62K 15/00
[52] U.S. Cl. ........................... 280/287; 403/328; 403/378
[58] Field of Search .................... 280/278, 287; 403/377, 378, 379, 328

[56] References Cited

U.S. PATENT DOCUMENTS

| | | | |
|---|---|---|---|
| 2,620,210 | 12/1952 | Wuster | 403/377 |
| 5,083,883 | 1/1992 | Ueda et al. | 403/328 |
| 5,098,241 | 3/1992 | Aldridge et al. | |
| 5,255,993 | 10/1993 | Kovacs | 403/328 |
| 5,381,707 | 1/1995 | Gill | 403/328 |
| 5,593,239 | 1/1997 | Sallee | 403/377 X |

FOREIGN PATENT DOCUMENTS

| | | |
|---|---|---|
| 1 505 598 | 9/1992 | European Pat. Off. . |
| 1 435 312 | 5/1976 | United Kingdom . |
| 2 284 850 | 6/1995 | United Kingdom . |

*Primary Examiner*—Kevin Hurley
*Attorney, Agent, or Firm*—Jacobson & Johnson

[57] ABSTRACT

A telescopic element, particularly for frames of folding bicycles, comprising a sliding inner element that can be locked in an operating position within an outer element by a quick locking element, the locking element comprising a ring that is normally in the position for locking the axial movement of the inner element with respect to the outer element, the locking element being movable radially by means of a release button.

18 Claims, 3 Drawing Sheets

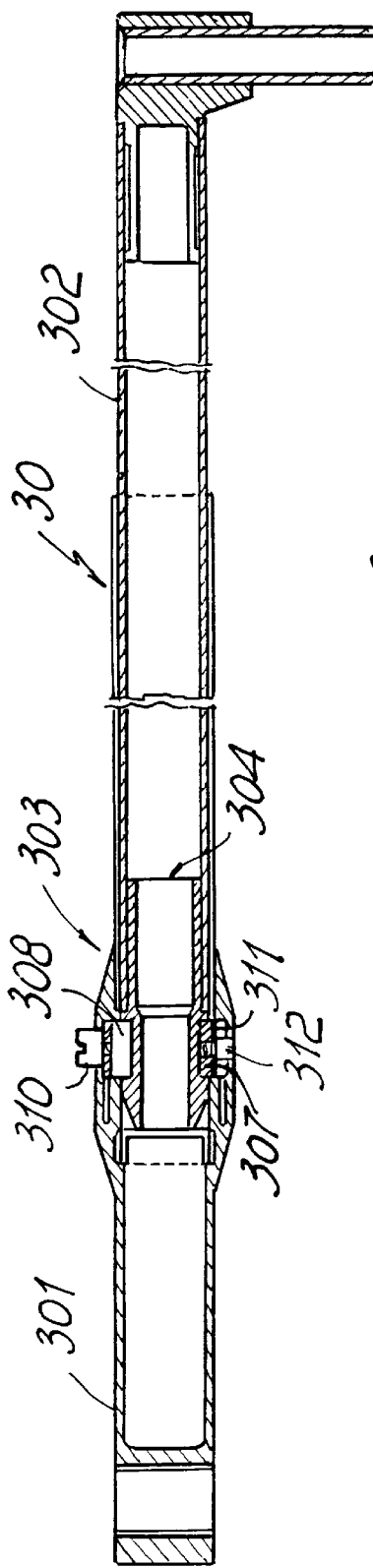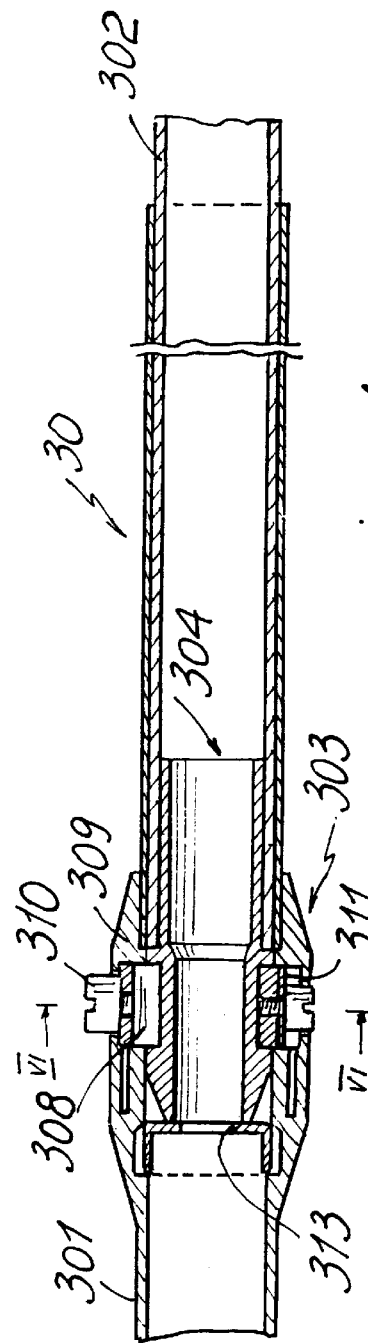

TELESCOPIC ELEMENT, PARTICULARLY FOR FRAMES OF FOLDING BICYCLES

BACKGROUND OF THE INVENTION

The present invention relates to a telescopic element, particularly for frames of folding bicycles.

The need has been felt for a telescopic element that can be quickly locked and released from the normal operating position but at the same time is also extremely resistant to the stresses to which it is subjected, for example when it is included in the frame of a bicycle or the like.

SUMMARY OF THE INVENTION

A principal aim of the present invention is to provide an extendable element provided with a quick and safe locking means.

Within the scope of this aim, an object of the present invention is to provide a telescopic element that is compact especially in the region provided with the locking means.

Another object is to provide a telescopic element that does not have troublesome and dangerous protrusions, especially with respect to its use as an element of a bicycle frame.

This aim, these objects, and others which will become apparent hereinafter are achieved by a telescopic element, particularly for frames of folding bicycles, comprising a sliding inner element that can be locked in an operating position within an outer element by a quick locking means, characterized in that said locking means comprises a locking element that is normally in the position for locking the axial movement of said inner element with respect to said outer element, said locking element being radially movable for the release of said inner element.

BRIEF DESCRIPTION OF THE DRAWINGS

Further characteristics and advantages of the invention will become apparent from the following detailed description of a preferred but not exclusive embodiment thereof, illustrated only by way of non-limitative example in the accompanying drawings, wherein:

FIG. 3 is a longitudinal sectional view of the telescopic element according to the invention in extended position;

FIG. 4 is an enlarged-scale partial longitudinal sectional view of the locking means of the telescopic element in the locking position;

DESCRIPTION OF THE PREFERRED EMBODIMENTS

Figure 1:
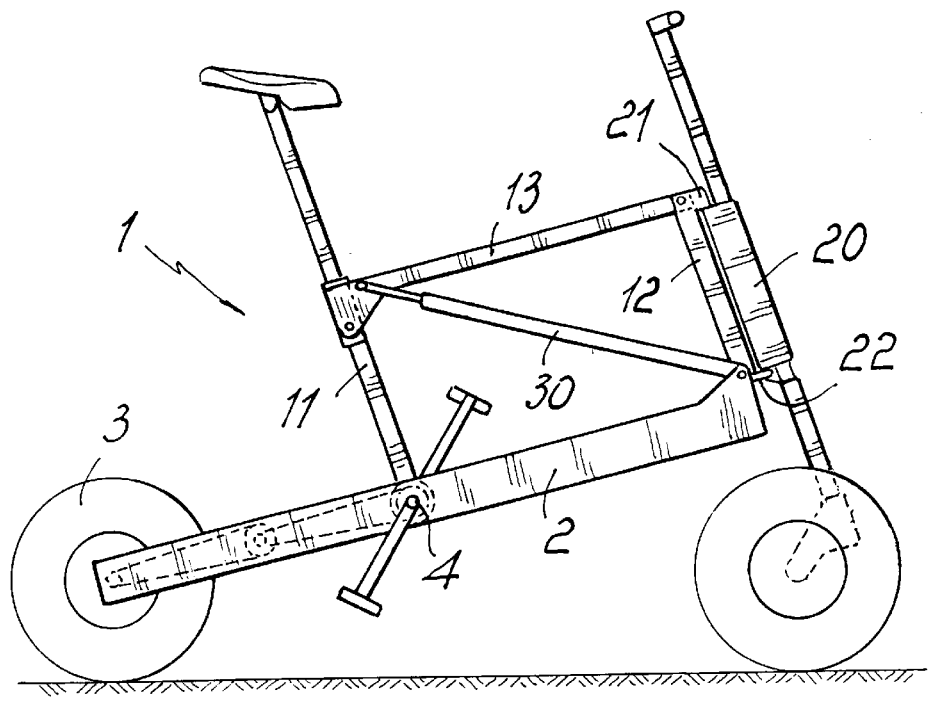
FIG. 1 is a lateral elevation view of a folding bicycle in the operating position, provided with the telescopic element according to the invention.

With reference to the above figures, a folding bicycle, generally designated by the reference numeral 1, comprises a frame constituted by a lower member 2 that rotatably supports a rear wheel 3 at its rear end. The pedal crank shaft 4 is rotatably supported in a median position. A saddle post 11 is pivoted to the lower member 2 at the pedal crank shaft coupling axis, and a handlebar post 12 is pivoted at the front end of the member 2. The posts 11 and 12 are substantially parallel to each other and are joined by an upper member 13 pivoted to the end of the posts 11 and 12.

The handlebar post 12 constitutes a supporting element for a head tube 20 that is articulated to the raised portions 21 and 22 formed at the ends of the post 12.

The telescopic element 30 is provided in order to lock the frame in the desired position and can be arranged at a diagonal of the articulated parallelogram.

Figure 2:
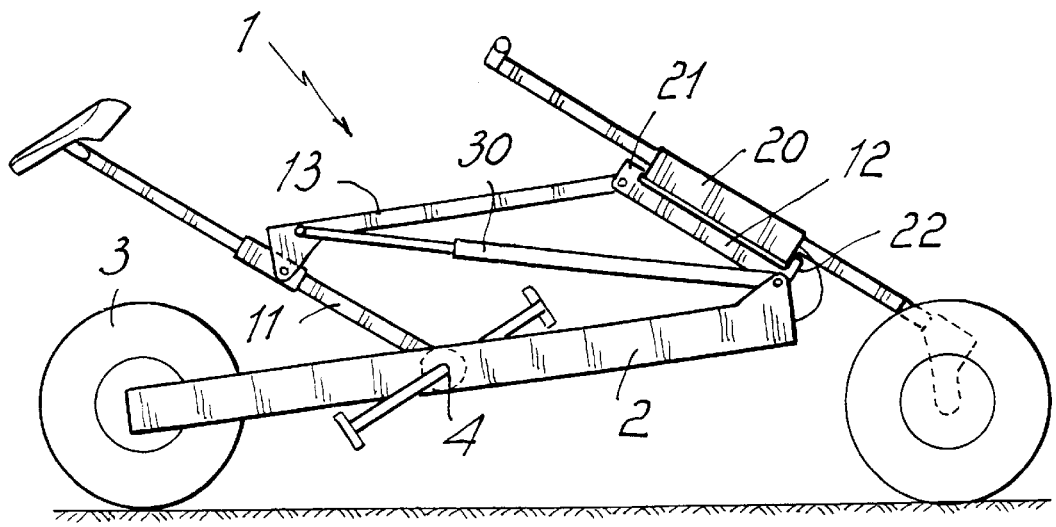
FIG. 2 is a view, similar to the preceding one, but in an almost-folded position.

As shown in FIG. 2, the bicycle is folded very easily; after releasing the telescopic element 30, folding occurs, in practice, by turning the saddle post towards the rear wheel.

The telescopic element 30 is constituted by an outer element 301 that telescopically couples to an inner element 302 through a locking means 303.

The inner element has a tip 304 provided with a tapered guiding portion 305 and an annular groove 306 adapted to be engaged by a locking ring 307 associated with the locking means 303.

The locking ring 307 is accommodated in an appropriate annular seat 308 formed in a wider region 309 of the end of the outer element 301.

The locking element 307 has a button 310 that acts in contrast with a flat spring 311 which is fixed by means of a screw 312 in a position lying diametrically opposite to the button 310.

The spring 311 tends to keep the locking ring 308 normally engaged with the annular groove 306 of the tip 304, so as to keep said tip 304 locked at the wider portion 309, as shown in FIG. 4.

The wider portion 309 furthermore has a stroke limiting element 313 for the tip 304 in the locking position, shown in FIG. 4.

Figure 5:
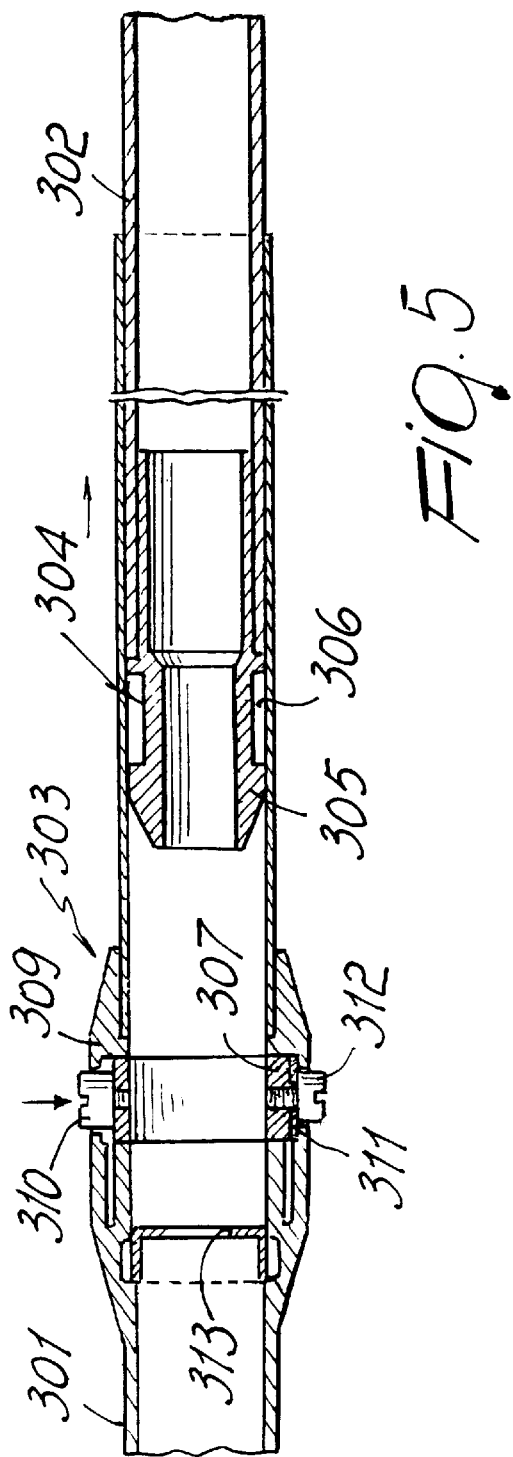
FIG. 5 is a view, similar to the preceding one, in the released position.
Figure 6:
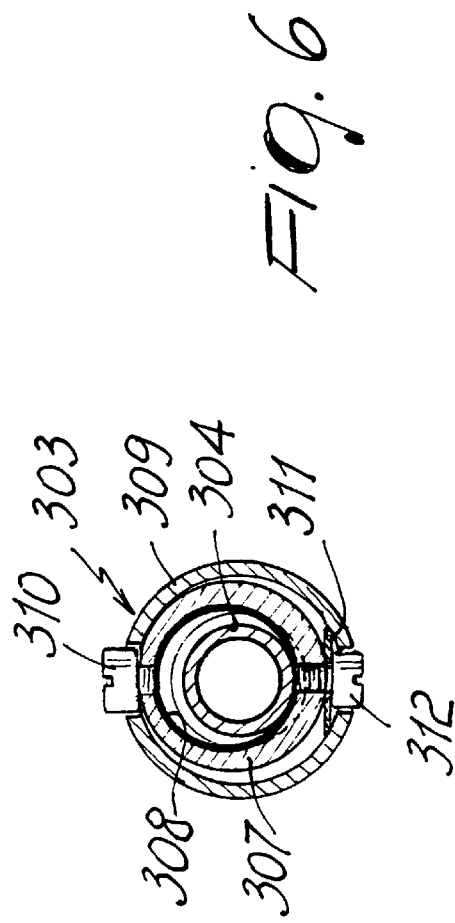
FIG. 6 is a sectional view, taken along the plane VI-VI of FIG. 4.

FIGS. 3 and 4 are views of the telescopic element 30 in the closed position that corresponds to the operating position of the bicycle, shown in FIG. 1. If one wishes to fold the bicycle and must therefore extend the telescopic element 30, it is sufficient to press the button 310 to move the ring 307 radially, in contrast with the spring 311, as shown in FIG. 5, thus releasing the annular groove 306 so as to allow the tip 304 to extend outwardly.

In order to return the bicycle to the operating position, it is not necessary to act on the button 310 again, since the tapered portion 305 of the tip 304 forces the ring 307 to move radially when the tip 304 is inserted in the wider portion 309.

In practice it has been observed that the invention achieves the intended aim and objects, a quick and safe locking/release system for a telescopic element having been provided.

Another advantage of the invention resides in the fact that there are no awkward protruding elements that are furthermore dangerous in a bicycle frame.

The telescopic element according to the invention is susceptible of numerous modifications and variations, all of which are within the scope of the inventive concept; furthermore, all the details may be replaced with technically equivalent elements.

Of course, the materials employed, as well as the dimensions, may be any according to the requirements and the state of the art.

What is claimed is:

1. A telescopic element, particularly for frames of folding bicycles, comprising a sliding inner element that can be locked in an operating position within an outer element by a quick locking means, wherein said locking means comprises a locking element that is normally in the position for looking the axial movement of said inner element with respect to said outer element, said locking element being radially movable for release of said inner element, wherein said locking means comprises a locking ring that is movable radially in an annular seat formed in one of said inner or outer elements, said locking ring being adapted to engage an annular groove formed in the other one of said inner or outer elements.

2. A telescopic element according to claim 1, wherein said locking means is arranged at the ends of said inner and outer elements.

3. A telescopic element according to claim 1, wherein the radial movement of said locking ring is actuated by a button that can be operated from the outside and in contrast with an elastic element.

4. A telescopic element according to claim 3, wherein said elastic element is constituted by a flat spring associated with said annular seat.

5. A telescopic element according to claim 1, wherein said annular seat is formed inside a wider portion of said outer element, said annular groove being formed on the outside of the end of said inner element.

6. A telescopic element according to claim 1, wherein said inner element comprises a tip provided with a tapered guiding portion that is adapted to enter at said locking ring to move said locking ring radially in order to lock said inner element within said outer element.

7. A telescopic element, particularly for frames of folding bicycles, comprising an inner element and an outer element, said inner element and said outer element being mutually slidingly connected along an axial direction of the telescopic element, the telescopic element further comprising a quick locking device for releasable locking said inner and outer elements in a releasable operating position, said locking device comprising a locking element releasably arrangeable in a locking position for releasbly locking the axial movement of said inner element with respect to said outer element, wherein said locking element comprises a locking ring that is movable radially in an annular seat formed in one of said inner or outer elements, said locking ring being adapted to engage an annular groove formed in the other one of said inner or outer elements.

8. The telescopic element of claim 7, wherein said locking device further comprises an elastic element engaging said locking ring so as to bias said locking ring in a radial direction substantially perpendicular to said axial direction into said locking position.

9. The telescopic element of claim 8, further comprising a button element engageable by a user externally to said telescopic element for being pushed by the user in a direction opposite to said radial direction for releasing said locking ring from said locking position.

10. The telescopic element of claim 7, wherein said annular seat is formed inside a wider portion of said outer element, said annular groove being formed on the outside of the end of said inner element.

11. The telescopic element of claim 7, wherein said inner element comprises a tip provided with a tapered guiding portion that is adapted to enter at said locking ring to move said locking ring radially in order to lock said inner element within said outer element.

12. The telescopic element of claim 7, wherein said elastic element is constituted by a flat spring associated with said annular seat.

13. A telescopic element particularly for frames of folding bicycles, comprising an inner element and an outer element, said inner element and said outer element being mutually slidingly connected along an axial direction of the telescopic element, the telescopic element further comprising a quick locking means for releasably locking said, inner and outer elements in a releasable operating position, said locking means comprising a locking element releasably arrangeable in a locking position for relesably locking the axial movement of said inner element with respect to said outer element, wherein said locking element comprises a locking ring that is movable radially in an annular seat formed in one of said inner or outer elements, said locking ring being adapted to engage an annular groove formed in the other one of said inner or outer elements.

14. The telescopic element of claim 13, wherein said locking means further comprises an elastic element engaging said locking ring so as to bias said locking ring in a radial direction substantially perpendicular to said axial direction into said locking position.

15. The telescopic element of claim 14, further comprising a button element engageable by a user externally to said telescopic element for being pushed by the user in a direction opposite to said radial direction for releasing said locking ring from said locking position.

16. The telescopic element of claim 13, wherein said annular seat is formed inside a wider portion of said outer element, said annular groove being formed on the outside of the end of said inner element.

17. The telescopic element of claim 13, wherein said inner element comprises a tip provided with a tapered guiding portion that is adapted to enter at said locking ring to move said locking ring radially in order to lock said inner element within said outer element.

18. The telescopic element of claim 13, wherein said elastic element is constituted by a flat spring associated with said annular seat.

* * * * *